L. D. VAUGHN & W. P. SAMPLES.
COMBINED FISH PLATE, BOND, AND PROTECTOR.
APPLICATION FILED MAY 22, 1915.
1,172,078.
Patented Feb. 15, 1916.
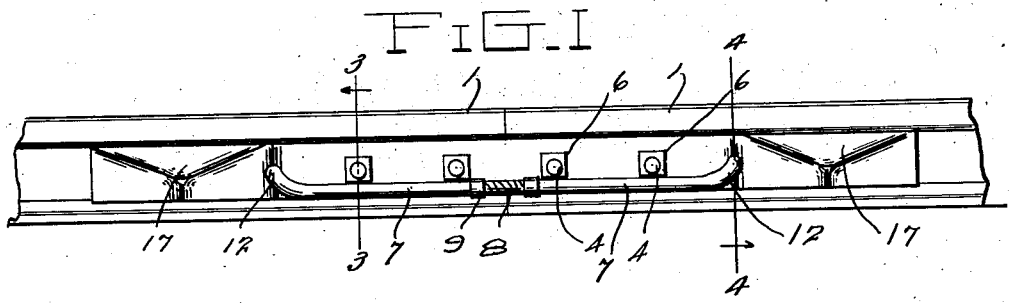
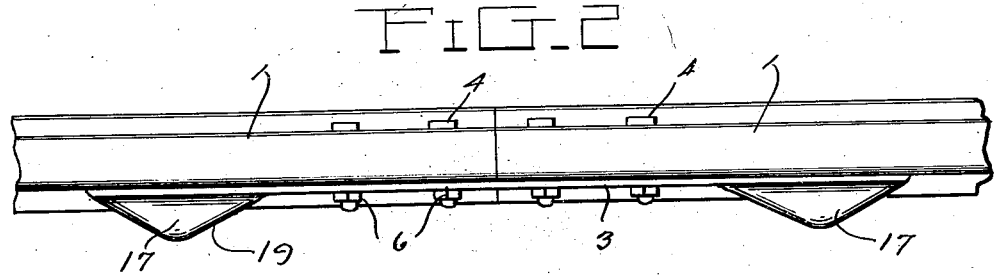
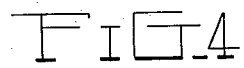
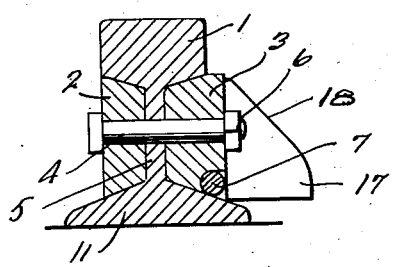
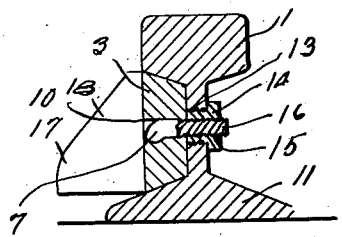
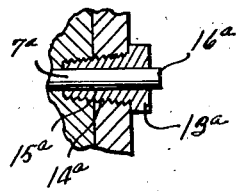
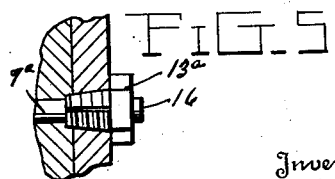
Inventors
L. D. Vaughn
& W. P. Samples
Witnesses
Chas. H. Trotter.
By
Attorney

UNITED STATES PATENT OFFICE.

LORENZO D. VAUGHN AND WILLIAM P. SAMPLES, OF GRAFTON, WEST VIRGINIA.

COMBINED FISH-PLATE, BOND, AND PROTECTOR.

1,172,078.  Specification of Letters Patent.  Patented Feb. 15, 1916.

Application filed May 22, 1915. Serial No. 29,839.

*To all whom it may concern:*

Be it known that we, LORENZO D. VAUGHN and WILLIAM P. SAMPLES, citizens of the United States, residing at Grafton, in the county of Taylor and State of West Virginia, have invented certain new and useful Improvements in Combined Fish-Plates, Bonds, and Protectors; and we do hereby declare the following to be a full, clear, and exact description of the invention, such as will enable others skilled in the art to which it appertains to make and use the same.

This invention relates to combined fish plates, bonds, and protectors, and one of the principal objects of the invention is to provide improved means for connecting the bonds to the meeting ends of rails by means of a fish plate through which the ends of the bonds extend, and special means for holding the ends in place.

Another object of the invention is to provide laterally extending deflectors for preventing the flanges of the wheels from striking the bond in case of derailment, and said bond being also provided with a flexible joint in the center thereof to yield as the rolling stock passes over the rail joint.

The foregoing and other objects and advantages may be attained by means of the construction illustrated in the accompanying drawing, in which—

Figure 1 is a side elevation of a rail joint showing a combined fish plate, bond and protector made in accordance with this invention, Fig. 2 is a top plan view of the same, Fig. 3 is a sectional view taken on the line 3—3 of Fig. 1, Fig. 4 is a sectional view taken on the line 4—4 of Fig. 1, Fig. 5 is a fragmentary detail section of a modified form of means for securing the ends of the bond in the fish plate, and Fig. 6 is a sectional view showing the same construction with the split nut also shown in section.

Referring to the drawing, the numeral 1 designates the meeting ends of a pair of railway rails, and 2 is an inner fish plate which spans the joint of the rails upon the inner sides thereof. An outer fish plate 3 spans the rail joint upon the outer side of the rails, and said inner fish plate and outer fish plate are connected together by means of bolts 4 extending through said fish plates and through the web 5 of the rail, said bolts 4 being provided with nuts 6. The rail bond comprises a body which consists of two sections 7, which are connected together in the center by means of a short section of cable or other suitable flexible element 8 connected to the inner ends of the section 7 by means of collars 9. The bond is fitted in a longitudinal groove 10 in the fish plate 3 near the base flange 11 of the rail. The ends of the bond section 7 are first bent upwardly as shown at 12, and are then bent at right angles to provide attaching arms 16 which extend through openings in the fish plate 3 and in the web 5 of the rails. The fish plate 3 is provided with a threaded opening 13, as shown in Fig. 4, and fitted in said threaded openings is a nut 14 having a threaded extension 15, and a threaded bore to receive the threaded arms 16 of the bond section 7.

As shown in Figs. 5 and 6, the bond 7$^a$ is provided with plain unthreaded attaching arms 16$^a$, and these arms pass through the webs of the rails, and through the fish plate 3 and a split nut 13$^a$ fits the unthreaded arms of the bond section and the threaded tapering portions 15$^a$ are forced into intimate contact with the end 16$^a$, by means of a threaded and tapering opening 14$^a$ in the fish plate.

Near the opposite end of the fish plate 3 are laterally extending deflector elements 17, the purpose of which is to deflect the flanges of the wheels in case of derailment to prevent the flanges from injuring or breaking the bond. These deflectors are provided with inclined surfaces 18, and are substantially triangular in form when viewed in plan, and the outer edges are rounded off as shown at 19.

From the foregoing it will be obvious that the bond section 7 being connected together in the center by a flexible member 8 immediately in alinement with the joint between the rails, will give to any undue pressure of the rolling stock passing over the joint, and that in case of derailment, the flanges of the wheels will be deflected outward away from the bonds. It will also be apparent that the manner of connecting the ends of the bond to the fish plates are reliable and efficient and cannot readily become displaced or injured.

Various changes may be made in the details of construction without departing from the spirit and scope of the invention as defined in the claims.

What we claim is:—

1. A rail bond comprising a body, attaching arms at the end of the body, said arms extending in an angular direction from the body, a fish plate through which said arms extend, a nut for securing said arms in the fish plate, said nut being provided with threaded portions extending into openings in the fish plate and engaging said arm.

2. A rail bond comprising a body, attaching arms at the end of the body, said arms being arranged at an angle with relation to the body, a fish plate through which said arms extend, and nuts for securing said arms in the fish plate, said nuts being provided with threaded portions engaging the arms and the web of a rail.

In testimony whereof we affix our signatures in presence of two witnesses.

LORENZO D. VAUGHN.
WILLIAM P. SAMPLES.

Witnesses:
L. E. BENNETT,
E. V. WILLIAMSON.